United States Patent [19]
Muller et al.

[11] 3,822,894
[45] July 9, 1974

[54] STEERING WHEEL WITH BUILT-IN AIR CUSHION

[75] Inventors: Reinhold Muller, Mainflingen; Konrad Randelzhofer, Glattbach, both of Germany

[73] Assignee: Petri Aktiengesellschaft, Aschaffenburg, Germany

[22] Filed: Sept. 23, 1971

[21] Appl. No.: 182,949

[30] Foreign Application Priority Data
Oct. 24, 1970   Germany............................ 2052357

[52] U.S. Cl. ......... 280/150 AB, 280/87 R, 220/31 S
[51] Int. Cl. ............................................. B60r 21/10
[58] Field of Search .................. 280/150 AB; 16/150; 292/253; 240/78; 220/319; 9/9, 316

[56] References Cited
UNITED STATES PATENTS

| | | | |
|---|---|---|---|
| 236,414 | 1/1881 | Briggs | 16/150 |
| 915,045 | 3/1909 | Schleicher | 292/253 |
| 2,195,602 | 4/1940 | Sale | 292/253 |
| 3,351,270 | 11/1967 | Hohnjec | 220/31 S |
| 3,385,422 | 5/1968 | Lowry | 16/150 |
| 3,632,135 | 1/1972 | Chute et al. | 280/150 AB |
| 3,632,136 | 1/1972 | Foltz | 280/150 AB |
| 3,640,546 | 2/1972 | Brawn | 280/150 AB |
| 3,657,752 | 4/1972 | Davidson | 9/9 |

FOREIGN PATENTS OR APPLICATIONS

| | | | |
|---|---|---|---|
| 609,624 | 9/1960 | Italy | 280/150 AB |
| 896,312 | 11/1953 | Germany | 280/150 AB |

OTHER PUBLICATIONS
Polymide Resins, D. Floyd, 5/23/66 pp. 120, 121.

*Primary Examiner*—Kenneth H. Betts
*Attorney, Agent, or Firm*—Karl F. Ross; Herbert Dubno

[57] ABSTRACT

It is known to provide a motor vehicle steering wheel with a central dish or cup containing a collapsed cushion which in the case of an accident is suddenly inflated. The cushion is normally enclosed by a cover, which on inflation of the cushion flies freely off. The present invention provides a strong hinge between the cover and the dish so that on inflation of the cushion the cover is pushed away from the driver, but not liberated.

1 Claim, 3 Drawing Figures

Reinhold MÜLLER,
Konrad RANDELZHOFER
*Inventor:*

By: Karl F. Ross

Attorney.

STEERING WHEEL WITH BUILT-IN AIR CUSHION

FIELD OF THE INVENTION

The invention relates to a steering wheel having a built-in air cushion to act as an impact guard.

BACKGROUND OF THE INVENTION

In steering wheels, it is known to locate an air cushion in a collapsed state in the steering-wheel dish, which is covered from above by a plate. The neck of the air cushion is connected to a valve of a compressed air container. In the event of an accident, such as by collision, the valve opens instantly with the result that the compressed air emitted from the container suddenly inflates the cushion, causing the body of the driver, which is propelled forwardly, to be caught by the cushion. During the sudden inflation of the air cushion the cover plate of the steering wheel dish is ripped out of its holder and flung into the passenger space, with risk of injury to the passengers of the vehicle.

SUMMARY OF THE INVENTION

This disadvantage is avoided by the present invention wherein the cover plate and the steering wheel are connected together by a strip of material having a high tear resistance, and composed for example, from synthetic fibers made of super polyamides. A cover plate secured in this manner remains connected to the steering wheel at the instant of the sudden inflation of the air cushion, without obstructing the expansion of the cushion into the space between the steering wheel and driver.

DESCRIPTION OF THE DRAWING

Reference is directed to the accompanying drawings, in which.

SPECIFIC DESCRIPTION

Figure 1:
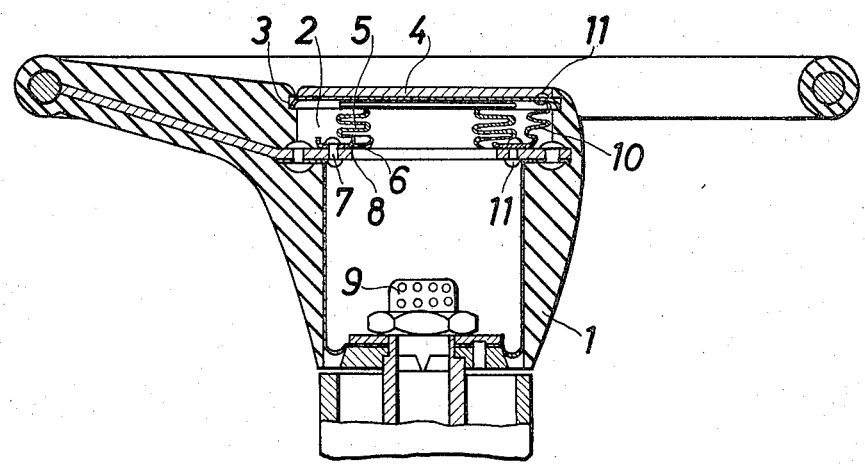
FIG. 1 shows a partial section through a steering wheel with built in air cushion according to the invention.
Figure 2:
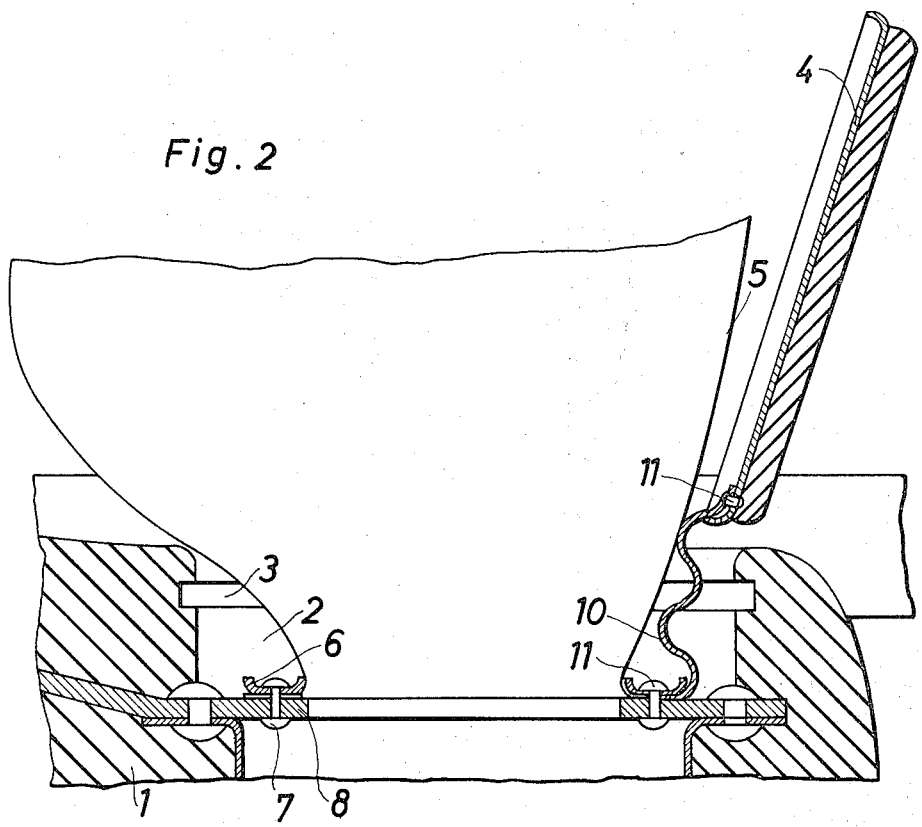
FIG. 2 shows the steering wheel dish in section.
Figure 3:
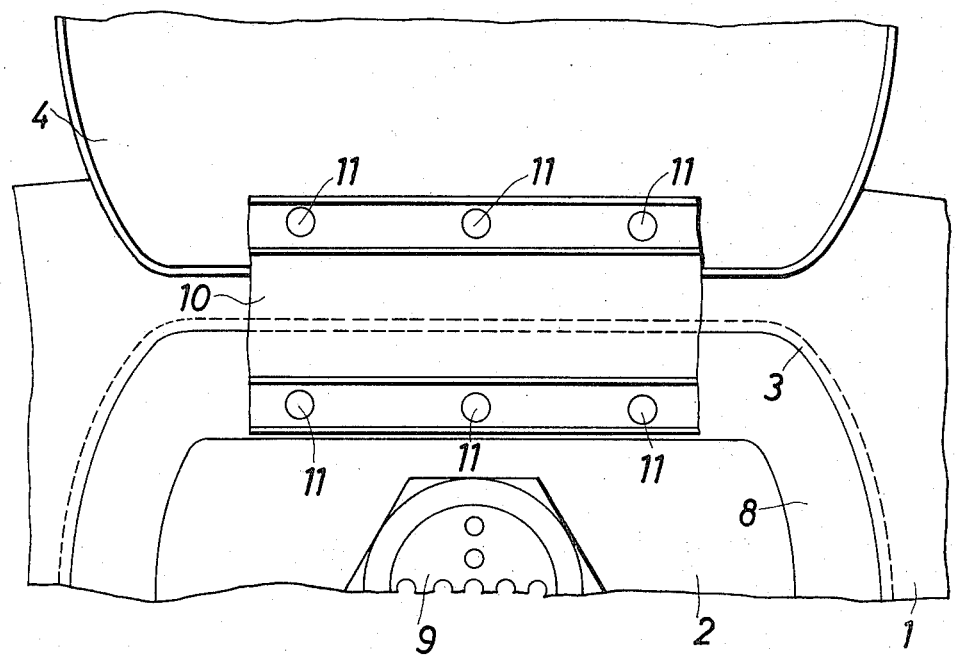
FIG. 3 shows the connection of the cover plate with the steering wheel.

In the drawings, 1 denotes the steering wheel boss or hub and 2 the steering wheel dish which is covered by a plate 4 retained in a groove 3 (FIGS. 2 and 3). In the steering wheel dish there is a collapsed, expansible air cushion 5 made of rubber, plastic material or the like, and fixed by means of a retaining ring 6 and rivets 7 on a lower rim 8 of the steering wheel dish. Below the air cushion there is a compressed air valve 9 connected to a compressed air container (not shown in the drawing). One end of a strip 10, e.g., made of plastic material is fastened to the edge 8 of the steering wheel dish and the other end to the underside of the cover plate 4, connecting these two parts flexibly together. The flexible but tear-resistant strip is secured by rivets 11 along one longitudinal edge. As shown in FIG. 1, the strip 10 is folded into a contracted state within the compartment in the center of the steering wheel receiving the bladder 5. The strip can then be drawn out in the width upon release of the cushion (FIG. 2).

FIG. 1 shows the steering wheel dish in a closed state, whilst FIG. 2 shows the result of inflation of the air cushion 5. The cover plate 4 is forcibly ejected from its holder 3 by the cushion and left connected to the steering wheel only by the strip 10.

The length and width of the strip 10 can be dimensioned as required. FIG. 3 shows a wide, short strip forming a kind of hinge, whilst the strip in FIG. 2 is longer and narrower.

We claim:
1. A steering-wheel assembly, comprising:
   a steering wheel for an automotive vehicle having a hub forming an upwardly open compartment;
   an inflatable bladder received within said compartment in a collapsed condition thereof and inflatable to emerge from said compartment and cushioned impact of a vehicle operator;
   a cover plate normally overlying said bladder in the collapsed state thereof and covering said compartment, said cover plate having one edge releasably engaging said hub;
   a flexible strip anchored to said hub and of contracted width received in said compartment, said strip being fixed to another edge of said cover plate and having a tear-resistance sufficient to resist rupture upon expansion of said bladder to dislodge said cover plate and expand the width of said strip, said strip flexibly attaching said cover plate to said hub upon expansion of said cushion; and
   rivet means for attaching said strip to said hub and to said plate, said strip being composed at least in part of polyamide fibers.

* * * * *